United States Patent
Dawson et al.

(10) Patent No.: US 11,692,127 B2
(45) Date of Patent: Jul. 4, 2023

(54) METHOD AND MATERIALS FOR HYDRAULIC FRACTURING WITH DELAYED CROSSLINKING OF GELLING AGENTS

(71) Applicant: Independence Oilfield Chemicals, LLC, The Woodlands, TX (US)

(72) Inventors: Jeffrey C. Dawson, Conroe, TX (US); Xiyuan Chen, The Woodlands, TX (US)

(73) Assignee: Independence Oilfield Chemicals, LLC, The Woodlands, TX (US)

( * ) Notice: Subject to any disclaimer, the term of this patent is extended or adjusted under 35 U.S.C. 154(b) by 215 days.

(21) Appl. No.: 17/327,396

(22) Filed: May 21, 2021

(65) Prior Publication Data

US 2021/0277758 A1 Sep. 9, 2021

Related U.S. Application Data

(62) Division of application No. 16/172,466, filed on Oct. 26, 2018, now Pat. No. 11,015,422, which is a division of application No. 14/839,927, filed on Aug. 29, 2015, now Pat. No. 10,113,405.

(60) Provisional application No. 62/211,435, filed on Aug. 28, 2015, provisional application No. 62/043,795, filed on Aug. 29, 2014.

(51) Int. Cl.

| | |
|---|---|
| C09K 8/68 | (2006.01) |
| C09K 8/584 | (2006.01) |
| C09K 8/64 | (2006.01) |
| C09K 8/588 | (2006.01) |
| E21B 43/26 | (2006.01) |
| C09K 8/60 | (2006.01) |
| C09K 8/82 | (2006.01) |
| C09K 8/90 | (2006.01) |

(52) U.S. Cl.
CPC .............. *C09K 8/685* (2013.01); *C09K 8/584* (2013.01); *C09K 8/588* (2013.01); *C09K 8/602* (2013.01); *C09K 8/64* (2013.01); *C09K 8/82* (2013.01); *C09K 8/90* (2013.01); *E21B 43/26* (2013.01)

(58) Field of Classification Search
None
See application file for complete search history.

(56) References Cited

U.S. PATENT DOCUMENTS

| | | | |
|---|---|---|---|
| 6,225,264 B1 * | 5/2001 | Moorhouse | C09K 8/685 507/903 |
| 6,620,769 B1 * | 9/2003 | Juppe | C04B 24/36 507/213 |
| 7,524,796 B1 * | 4/2009 | Heilman | C09K 8/34 507/213 |
| 8,371,383 B2 * | 2/2013 | Bell | C09K 8/685 166/305.1 |
| 8,895,480 B2 * | 11/2014 | Dawson | E21B 43/267 166/308.1 |
| 10,113,405 B2 * | 10/2018 | Dawson | E21B 43/26 |
| 11,015,422 B2 * | 5/2021 | Dawson | C09K 8/685 |
| 2006/0009363 A1 * | 1/2006 | Crews | C09K 8/685 507/100 |
| 2014/0034323 A1 * | 2/2014 | Dobson, Jr. | C09K 8/90 507/224 |

* cited by examiner

*Primary Examiner* — John J Figueroa

(57) ABSTRACT

A non-aqueous slurry contains a non-aqueous liquid immiscible in water (such as a hydrocarbon based oil) having dispersed therein a crosslinking agent (such as a borate crosslinking agent) and an oil-wetting surface active material. The non-aqueous slurry further contains an organophilic clay. The non-aqueous slurry, when used in an aqueous fracturing fluid, provides crosslinking delay between the crosslinking agent and a hydratable polymer, such as guar or guar derivatives. The aqueous fracturing fluid provides an enhanced fracture network after being pumped into a well.

22 Claims, No Drawings

METHOD AND MATERIALS FOR HYDRAULIC FRACTURING WITH DELAYED CROSSLINKING OF GELLING AGENTS

This application is a divisional application of U.S. patent application Ser. No. 16/172,466, filed on Oct. 26, 2018, which is a divisional application of U.S. patent application Ser. No. 14/839,927, filed on Aug. 29, 2015, which claims the benefit of U.S. patent application Ser. No. 62/043,795, filed on Aug. 29, 2014, and U.S. patent application Ser. No. 62/211,435, filed on Aug. 28, 2015, all of which are herein incorporated by reference.

FIELD OF THE DISCLOSURE

The disclosure relates to non-aqueous slurries, fracturing fluids containing such slurries and methods of using the fracturing fluids in the treatment of a subterranean formation penetrated by a well. The non-aqueous slurries improve the performance of crosslinked fracturing fluids.

BACKGROUND OF THE DISCLOSURE

Hydraulic fracturing of conventional oil- and gas-bearing formations requires the high-pressure injection of a fracturing fluid from the well into the formation. During this process, the rock will fail, forming a crack or fracture. This occurs when the surface pumping pressure plus the hydrostatic pressure of the fluid in the wellbore less the friction loss from flow of the fluid through pipe and perforations exceeds the formation stresses.

The direction of the fracture created using conventional fracturing techniques is away from the wellbore in a bi-wing manner and perpendicular to the formation's least principle stress. The fracture growth in bi-wing fractures continues as the pressure and the fluid rate entering the fracture are greater than the fluid lost to the formation from the fracture. Once fracture growth is initiated, small amounts of proppants, such as well-rounded sand, having sizes ranging from 70/140 to 16/20 mesh may be added to the fluid. Normally, the amount of proppant per gallon of fluid increases as the treatment progresses.

The fracturing fluid is normally a high-viscosity fluid that can be described as a gel or semi-solid. It is based on a gelling agent such as guar gum that is crosslinked with chemicals like borate ion, zirconium and titanium chelates such as zirconium lactate and zirconium lactate triethanolamine. The viscosity can range from 200 to 2000 cP at 40 $sec^{-1}$, but typically ranges from 400 to 1000 cP at 40 $sec^{-1}$. The viscosity is needed to create fracture width and to carry the proppant deep within the fracture.

Conventional fracturing techniques are, however, often not acceptable in the fracturing of shale and tight gas formations exhibiting a permeability less than 10 mD and in some cases lower than 1.0 mD and often lower than 0.1 mD. (Permeability is a measure of the resistance of flow in porous materials like sedimentary formation rock.) Whereas conventional reservoirs require the creation of bi-wing fractures, the fracturing of low permeability formations, such as shale, requires maximizing complex fracture development, or the creation of secondary and tertiary fractures forming off from the primary fracture. Two factors promote fracture complexity. First, that the fracturing fluid be pumped at a high rate. Second, that the fracturing fluid be a very thin fluid.

While slickwater fracturing has become a preferred fracturing fluid in the treatment of low permeability reservoirs, it has major drawbacks. Slickwater fluids are normally composed of water and 0.25 to 2.0 gal/1000 gal water of a friction reducer. The friction reducers are normally added to water as invert polymer emulsions based on anionic or cationic polyacrylamide. The low viscosity fluid does not allow adequate proppant transport in the fracture, nor does it create enough fracture width to fill the fracture with higher loadings of larger-sized proppant. Slickwater fracturing is thus more suitable for high mobility gas, where lesser amounts of proppant are required. For oil, which is less mobile than gas, the proppant has to be of a larger size and wider fractures are needed to adequately drain the reservoir. This is currently accomplished by the sequential pumping of slickwater followed by conventional high viscosity fluids, neither fluid having the ideal characteristics to hydraulically fracture a shale reservoir.

Alternatives have been sought for low viscosity fluids which enhance the creation of a fracture network in low permeability reservoirs and which provide enhanced proppant transport into the created fractures.

SUMMARY OF THE DISCLOSURE

The disclosure relates to a non-aqueous slurry having a non-aqueous liquid immiscible in water, an oil-wetting surface active material and a crosslinking agent.

In an embodiment, the disclosure relates to a non-aqueous oil slurry of an oil having dispersed therein an oil-wetting surface active material and a crosslinking agent. The non-aqueous oil slurry may contain an organophilic clay.

In another embodiment, the disclosure relates to a non-aqueous oil borate containing slurry comprising an oil having dispersed therein a crosslinking agent and an oil-wetting surface active material. The non-aqueous oil borate containing slurry further contains an organophilic clay. The oil-wetting surface active material has a hydrophilic and a hydrophobic portion. The crosslinking agent comprises a borate salt. The borate salt may be selected from the group consisting of sodium borate decahydrate, sodium tetraborate decahydrate, sodium tetraborate pentahydrate, sodium tetraborate anhydrous, sodium metaborate and disodium octaborate tetrahydrate as well as mixtures thereof. The hydrocarbon based oil may be hydrotreated naphtha or raffinate.

In another embodiment, the disclosure relates to a well treatment fluid comprising a non-aqueous slurry referenced in the paragraphs above as well as a water-soluble gellant. Preferred water-soluble gellants include underivatized guar, guar derivative, locust bean gum, tara gum, fenugreek gum, cellulose and cellulosic derivatives.

In another embodiment, the disclosure relates to an aqueous well treatment fluid containing a non-aqueous slurry referenced in the paragraphs above and the water-soluble gellant. The viscosity of the aqueous well treatment fluid is less than 20 cP at 40 $sec^{-1}$; in most cases, the viscosity is from about 10 to about 20 cP at 40 $sec^{-1}$. The amount of gellant in the well treatment fluid is between from about 6 to about 40 pounds per thousand gallons (pptg) of water. In a preferred embodiment, the amount of gellant in the well treatment fluid is between from about 8 to about 15 pptg of water. Further, the amount of gellant in the well treatment fluid may be between from about 10 to about 12 pptg of water.

In another embodiment, the disclosure relates to a well treatment fluid containing a non-aqueous slurry referenced in the paragraphs above and a non-aqueous slurry containing the water-soluble gellant.

In another embodiment of the disclosure, a method of fracturing a subterranean formation is provided by pumping into the well an aqueous well treatment fluid referenced in the paragraphs above. A fracture network may be created in the formation after pumping of the aqueous well treatment fluid.

In another embodiment, a method of enhancing the transport capability of a proppant in a hydraulic fracturing operation is provided. In this embodiment, a fracturing fluid comprising a gellant is pumped into a well. The loading of the gellant in the fracturing fluid is between from about 6 to about 40 pptg of water. The fracturing fluid further contains a non-aqueous slurry containing a non-aqueous liquid immiscible in water, an oil-wetting surface active material and a crosslinking agent. The viscoelasticity of the fracturing fluid, as measured by its storage modulus and viscous modulus, is enhanced by the presence of the oil-wetting surface active material in the fracturing fluid.

In another embodiment, a method of enhancing the transport capability of a proppant in a hydraulic fracturing operation is provided. In this embodiment, a fracturing fluid comprising a gellant of underivatized guar, guar derivative, locust bean gum, tara gum, fenugreek gum, cellulose, cellulosic derivatives or a mixture thereof is pumped into a well. The loading of the gellant in the fracturing fluid is between from about 6 to about 40, preferably from about 6 to about 12, pptg of water. The fracturing fluid further contains an oil-based slurry comprising an oil having dispersed therein an organophilic clay, an oil-wetting surface active material having a hydrophilic and a hydrophobic portion and a crosslinking agent comprising a borate salt or a borate ion releasing compound including boric acid, alkali metal borates such as sodium diborate, potassium tetraborate, sodium tetraborate, pentaborates, alkaline borates, zinc metal borates, boric oxide, sodium borate decahydrate, sodium tetraborate decahydrate, sodium tetra borate pentahydrate, sodium tetraborate anhydrous, sodium metaborate and disodium octaborate tetrahydrate and mixtures thereof. The viscoelasticity of the fracturing fluid, as measured by its storage modulus and viscous modulus, is enhanced by the presence of the oil-wetting surface active material in the fracturing fluid.

In another embodiment of the disclosure, a method for delaying the crosslinking time of a gellant in water is provided. In this embodiment, gellant is added to water. A non-aqueous slurry containing a non-aqueous liquid, an oil-wetting surface active material and a crosslinking agent is added to the aqueous fluid containing the gellant. The oil-wetting surface active material decreases the rate of wetting of the crosslinking agent by water. The decrease in the rate of wetting may also be attributable to the combination of the oil-wetting surface active material and non-aqueous liquid. This, in turn, delays the crosslinking of the gellant with the crosslinking agent.

In another embodiment of the disclosure, a method for delaying the crosslinking time of a gellant selected from underivatized guar, derivatized guar, locust bean gum, tara gum, fenugreek gum, cellulose, cellulosic derivatives or a mixture thereof in water is provided. In this embodiment, gellant is added to water. A non-aqueous oil borate containing slurry comprising an oil having dispersed therein a borate salt crosslinking agent is added to the aqueous fluid containing the gellant. The non-aqueous oil borate containing slurry further contains an oil-wetting surface-active material and organophilic clay. The rate of wetting of the borate salt in the aqueous fracturing fluid is decreased by the oil-wetting surface active material being dispersed in the non-aqueous oil slurry. This, in turn, delays the crosslinking of the gellant with the borate salt.

In another embodiment of the disclosure, a method of enhancing the recovery of oil or gas from an oil or gas well is provided. In this method, an aqueous fracturing fluid having a viscosity of from about 4 to about 20 cP at 40 sec$^{-1}$ is pumped into the oil or gas well during a fracturing operation. The aqueous fracturing fluid contains (i) a non-aqueous liquid slurry containing a non-aqueous liquid immiscible in water, an oil-wetting surface active material and a crosslinking agent; (ii) a gellant and (iii) an oxidative or enzyme breaker. The amount of gellant in the aqueous fluid is between from about 6 to about 40 pptg of water.

In another embodiment of the disclosure, a method of enhancing the recovery of oil or gas from an oil or gas well is provided. In this method, an aqueous fracturing fluid having a viscosity of from about 4 to about 20 cP at 40 sec$^{-1}$ is pumped into the oil or gas well during a fracturing operation. The aqueous fracturing fluid contains (i) a non-aqueous oil slurry comprising a hydrocarbon based oil having dispersed therein an organophilic clay, an oil-wetting surface active material having a hydrophilic and a hydrophobic portion and a crosslinking agent comprising a borate salt selected from the group consisting of sodium borate decahydrate, sodium tetraborate decahydrate, sodium tetraborate anhydrous, sodium metaborate, sodium tetra borate pentahydrate and disodium octaborate tetrahydrate and mixtures thereof; (ii) a gellant selected from underivatized guar, derivatized guar, locust bean gum, tara gum, fenugreek gum, cellulose, cellulosic derivatives or a mixture thereof and (iii) an oxidative or enzyme breaker. The amount of gellant in the aqueous fluid is between from about 6 to about 40 pptg of water.

In another embodiment of the disclosure, a method of reducing formation damage to a subterranean formation subjected to a hydraulic fracturing operation is provided. In this method, an aqueous fracturing fluid, having a viscosity of from about 4 to about 20 cP at 40 sec$^{-1}$, is pumped into a well penetrating the subterranean formation during the hydraulic fracturing operation. The aqueous fracturing fluid contains (i) a non-aqueous slurry containing a non-aqueous liquid immiscible in water, an oil-wetting surface active material and a crosslinking agent; (ii) a gellant; and (iii) an oxidative or enzyme breaker. The amount of gellant in the aqueous fluid is between from about 6 to about 40 pptg of water.

In another embodiment of the disclosure, a method of reducing formation damage to a subterranean formation subjected to a hydraulic fracturing operation is provided. In this method, an aqueous fracturing fluid, having a viscosity of from about 4 to about 20 cP at 40 sec$^{-1}$, is pumped into a well penetrating the subterranean formation during the hydraulic fracturing operation. The aqueous fluid contains (i) a non-aqueous oil slurry comprising an oil having dispersed therein an organophilic clay, an oil-wetting surface active material having a hydrophilic and a hydrophobic portion and a crosslinking agent comprising a borate salt selected from the group consisting of sodium borate decahydrate, sodium tetraborate decahydrate, sodium tetraborate anhydrous, sodium metaborate, sodium tetra borate pentahydrate and disodium octaborate tetrahydrate and mixtures thereof; (ii) a gellant selected from underivatized guar, derivatized guar, locust bean gum, tara gum, fenugreek gum, cellulose, cellulosic derivatives or a mixture thereof and (iii) an oxidative or enzyme breaker. The amount of gellant in the aqueous fluid is between from about 6 to about 40 pptg of water.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure. It should be understood that the description herein, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function.

Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

The description and examples are presented solely for the purpose of illustrating the preferred embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited.

In the summary of the disclosure and this detailed description, each numerical value may be read as being modified by the term "about" as well as being read by not being modified by the term "about". Also, in the summary of the disclosure and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

Further, reference to viscosity measured at 511 sec$^{-1}$ set forth herein is measured with a Fann Model 35 type viscometer with an F1 spring, B1 bob, and R1 rotor at a shear rate in sec-1 at 77° F. (25° C.) and a pressure of 1 atmosphere. Viscosity measurements made at 40 sec$^{-1}$ were made using a high temperature high pressure Grace 5600 using a R1 B5 cup and bob at ambient temperature and at elevated temperatures encountered in a shale reservoir (240° F.). The oscillatory shear measurements were made with a Grace 5600 using a R1B5 cup and bob at 72° F.

A complex fracture network may be created in a hydrocarbon producing reservoir by pumping into the reservoir a non-aqueous slurry containing a non-aqueous liquid immiscible in water. The slurry may be used in the fracturing of formations penetrated by horizontal as well as vertical wellbores.

The non-aqueous slurry has particular applicability in the treatment of unconventional hydrocarbon reservoir formations such as low permeability or "tight" formations, such as shale, tight sandstone (typically having a pore throat size from about 0.03 to about 2.0 μm) and coal bed methane wells. Typically, the permeability of such a formation is less than 10 mD, more typically less than 1 mD. In a preferred embodiment, the non-aqueous slurry may be used in the treatment of shale formations.

The non-aqueous slurry comprises a non-aqueous liquid immiscible in water. The non-aqueous slurry further has a crosslinking agent and an oil wetting-surface active material. The slurry may further optionally contain an organophilic clay with or without a clay activator.

The presence of the oil wetting-surface active material in the non-aqueous slurry enables delayed crosslinking reaction time of the crosslinking agent with gelling agent in the aqueous well treatment fluid. While not intending to be bound by any theory, the delay in crosslinking time is believed to be attributable to the wetting characteristics of the surface active material to the crosslinking agent dispersed in the non-aqueous slurry. By enabling a delay in the crosslinking reaction time, hydraulic horsepower is reduced during pumping of the fluid into the well.

The increase in crosslinking time minimizes unnecessary friction pressure in a pipe during pumping of the fluid into the wellbore. High friction pressures are problematic since they require higher hydraulic horsepower to fracture the well and, thus, increase operating expenses.

The non-aqueous liquid is typically a hydrocarbon derived oil and is preferably a non-polar oil. Suitable non-polar oils include non-polar hydrocarbon oil including $C_3$-$C_{20}$ hydrocarbons including olefins. In a preferred embodiment, the non-polar oil is a refined oil such as hydro-treated naphtha or a raffinate oil. Other oils may include mineral oil or diesel oil. Vegetable oils may also be used.

The non-aqueous liquid of the slurry may also be a non-aqueous liquid immiscible in water. Such liquids may include alcohols, ketones, carboxylic acids, fatty acids, fatty alcohols, amines, amides as well as carbon disulfide.

Typically, the amount of non-aqueous liquid in the slurry is between from about 100 to about 500, preferably from about 200 to 235, pounds per barrel (ppb) of the non-aqueous slurry.

The crosslinking agent is typically a borate ion releasing compound or other boron releasing compound. The borate crosslinking agent can be any borate ion source and includes organoborates, monoborates, polyborates, mineral borates, boric acid, borax, sodium borate, including anhydrous or any hydrate, borate ores such as colemanite or ulexite as well as any other borate complexed to organic compounds to delay the release of the borate ion, such as taught in U.S. Pat. No. 5,145,590.

Typically, the crosslinking agent is a borate salt such as sodium borate decahydrate, sodium tetraborate decahydrate, sodium borate pentahydrate, sodium tetraborate anhydrous, sodium metaborate and sodium octaborate tetrahydrate as well as combinations thereof. In a preferred embodiment, the borate salt is disodium octoborate tetrahydrate. Typically, between from about 30 to about 250, preferably from about 65 to about 135, more preferably from about 83 to about 116, ppb of the non-aqueous oil borate containing slurry is the borate salt.

When the crosslinking agent is a borate salt, the oil slurry further contains dispersed therein an organophilic clay. The organophilic clay acts as a suspending agent to keep the borate salt dispersed in the oil and to provide a uniform (or even) distribution of the crosslinking agent in the dispersion.

The organophilic clay, which associates with oily surfaces and rejects aqueous surfaces, may be the reaction product of purified smectite clay (such as hectorite, bentonite, attapulgite, sepiolite, montmorillonate, etc.) and a quaternary ammonium salt. It includes coated clay (or lignite) such as clay coated with a fatty-acid quaternary amine. The coating imparts dispersability of the clay in the oil. Exemplary organophilic clays include those disclosed in U.S. Patent Publication No. 20070197711 and U.S. Patent Publication No. 20100305008, herein incorporated by reference. Included here are organo bentonites such as BENTONE® clays of Element is Specialties, Inc. and Claytone SF, a product of Southern Clay Products. Further, such organophilic clays may be ion exchanged clays. See, for instance, U.S. Patent Publication No. 20010056149, herein incorporated by reference. Typically, between from 2 to about 40, preferably from about 6 to 10, more preferably from about 8 to about 8.5, ppb of the non-aqueous oil borate containing slurry is the organophilic clay.

The clay may need to be activated in the non-polar oil. Suitable clay activators include propylene carbonate, ethanol and combinations thereof. When present, the amount of clay activator typically ranges from about 15% to about 75%, typically from about 25 to about 60%, more typically from about 40% to about 50%, by weight of the clay.

The oil-wetting surfactant aids in the wetting and/or dispersion of the crosslinking agent by the non-aqueous liquid. Preferred oil-wetting surfactants are those having a tendency to absorb onto the surface of the crosslinking agent and include cationic surfactants as well as non-ionic surfactants.

Thus, the oil-wetting surface active material has a hydrophobic part and a hydrophilic part that has a strong affinity for the crosslinking agent. While not being bound to any particular theory, it is believed that the oil-wetting surface active material absorbs onto the surface of the crosslinking agent such that the crosslinking agent becomes oil wet over a longer period of time. When the non-aqueous slurry is added to water, the crosslinking agent does not immediately dissolve. Crosslinking of the crosslinking agent and the gellant is therefore delayed. Typically, there may be a 90 second to 3 minute delay time. The delay may be regulated based on the oil-wetting surface active material and the amount of oil-wetting surface active material in the non-aqueous slurry. Thus, instantaneous crosslinking of the crosslinking agent and the gellant is delayed by regulating the dissolution time of the crosslinking agent; the dissolution time being regulated by the oil-wetting surface active material absorbed onto the oil coated or oil like state of the crosslinking agent.

Suitable oil-wetting surface active materials for delaying the crosslinking of the gellant with crosslinking agents include those having one or more hydroxyl groups or derivatives thereof on the polar (hydrophilic) part of the oil-wetting surface active material. Preferably the oil-wetting surface active material has more than one hydroxyl, ether and/or ester group. In addition to delaying the crosslinking, the surface active member further thins the viscosity of the slurry.

The amount of oil-wetting surface active material in the non-aqueous slurry depends on the desired delay time and the viscosity limits needed for the stability of the slurry. The required delay time can be determined from well data and the time needed can be adjusted by the concentration of the oil-wetting surface active material in the slurry. Typically, the amount of oil-wetting surface active member dispersed in the slurry is between from about 0.05 to about 10, preferably from about 0.05 to about 30 percent by weight based on the weight of the slurry. In some embodiments, relatively low amounts are preferred for example 0.05 to 10, preferably from about 0.05 to above 3, more preferably from about 0.1 to about 1.0, percent by weight based on the weight of the slurry. In other embodiments, higher amounts are preferred, for example 10 to 30 percent by weight, based on the total weight of the slurry.

Preferred oil-wetting surface active materials include polyhydric esters, such as sorbitan esters (esterified dehydration products of sorbitol). The fatty acid portion of the ester is normally derived from fatty acids having from about 6 to about 30, preferably from about 12 to about 20, carbon atoms. Typical examples of said fatty acids being lauric acid, myristic acid, palmitic acid, stearic acid, oleic acid, and behenic acid. Preferred sorbitan esters include sorbitan monooleate, sorbitan monolaurate, sorbitan monopalmitate and sorbitan trioleate. Further preferred are polyoxyethylene glycol sorbitan esters (like those having an HLB value of 14 or more). Suitable polyoxyethylene glycol sorbitan esters include polyoxyethylene glycol sorbitan hexaoleate and polyoxyethylene sorbitol hexaoleate.

Ethoxylates of the sorbitan esters may also be used wherein one or more of hydroxyl groups may contain from 1 to about 20 oxyethylene units as well as mixtures thereof. Examples include POE(5) sorbitan monooleate, POE(2) sorbitan monooleate, POE(20) sorbitan monolaurate, etc.

Other preferred oil-wetting surface active materials include alkoxylated (such as ethoxylated, propoxylated, ethopropoxylated) glycerides of plant or animal origin. Suitable mono-, di- and tri-glycerides may be derived from lard, tallow, ground nut oil, butter oil, cotton seed oil, linseed oil, olive oil, palm oil, palm kernel oil, canola oil, grape seed oil, fish oil, soybean oil, castor oil, rapeseed oil, copra oil, or coconut oil and comprise a total number of alkoxylated units between 1 and 60, are suitable. Preferred are ethoxylated glycerides. The number of alkoxylated units in the polyalkoxylated glyceride is typically between from 1 to about 60.

Alkoxylated glycerides may be obtained by alkoxylation of the mono-, di- or tri-glyceride by an alkylene oxide such as ethylene oxide, propylene oxide or butylene oxide or mixtures thereof; or by transesterification of a glyceride with a polyalkylene glycol. In a preferred embodiment, an ethoxylated mono or diglyceride is prepared from glycerol; linear or branched $C_4$-$C_{30}$, preferably $C_{10}$-$C_{19}$, more preferably $C_{12}$-$C_{18}$ fatty acids; and 2 to 30 ethoxy and/or propoxy units, preferably 2 to 10 ethoxy units. In another preferred embodiment, an ethoxylated triglyceride comprises the reaction product of a triglyceride having free hydroxyl groups such as castor oil; and 2 to 30 ethoxy and/or propoxy units, preferably 2 to 10 ethoxy units. In a preferred embodiment, the HLB of the alkoxylated triglycerides is between 12 and 16.

Other preferred oil-wetting surface active materials are alkylene oxide adducts of a $C_6$-$C_{30}$, preferably a $C_5$-$C_{24}$, more preferably a $C_{10}$-$C_{24}$, alcohol or phenol, including alkyl, alkaryl and aryl substituted phenols. The alkylene oxide typically contains from two to five carbon atoms. Such surface active members include, lauryl polyoxyethylene glycol ether, stearyl polyoxyethylene glycol ether, cetyl polyoxyethylene glycol ether, and nonylphenol polyoxyethylene glycol ether. In addition, the surface active material may include ethylene oxide adducts of linear or branched monocarboxylic acids and having HLBs of greater than about 13.5, preferably greater than about 14.

Other oil-wetting surface active materials include ethoxylated mono or polyhydric alcohols or their derivatives. Preferred are those ethoxylated mono or polyhydric alcohols prepared from $C_9$-$C_{11}$ alkyl alcohols ethoxylated with from about 7 to about 10 moles of ethylene oxide per mole of alcohol. Such surface active materials include tridecanol ethoxylate.

In a more preferred embodiment, the polyoxyalkylene glycol ethers contain hydrophobic and hydrophilic blocks, each block preferably being based on at least one oxyethylene group or oxypropylene group or a mixture thereof. Exemplary of such surface active materials are those set forth in U.S. Pat. No. 6,395,686, herein incorporated by reference.

Also preferred are reactive surface active materials of the formula $R_1O$—$(CH_2CHR_2O)_x$—$(CH_2CH_2O)_y$—$(CH_2CHR_3O)_z$—$R_4$ where $R_1$ is either alkyl, aryl, alkylaryl, or aralkylaryl of 8-30 carbon atoms, $R_2$ is —$CH_2OCH_2CH$=$CH_2$ (AGE); $R_3$ is either H, $CH_3$ or $CH_2CH_3$; $R_4$ is H or —$SO_3M$ or —$PO_3M$ where M is H or K, Na, $NH_4$, $NR_4$, alkanolamine, or other cationic species and x=2-100; y=4-200 and z=0-50. Such reactive surface active materials are set forth in U.S. Pat. No. 9,051,341, herein incorporated by reference.

The non-aqueous slurry is preferably a non-aqueous oil based slurry containing the surface active material, borate salt as crosslinking agent and organophilic clay. The oil based slurry may be produced by first adding the organophilic clay to the hydrocarbon derived oil to render a clay enriched oil slurry. When necessary, the clay activator may be added to the clay enriched oil slurry. Typically, the organophilic clay and hydrocarbon derived oil and, when needed, clay activator are mixed in a blender at room temperature until the oil mixture thickens to a viscosity in excess of 12 cP at 511 sec$^{-1}$, and preferentially above 15 cP. The oil-wetting surface active material may then be added to the clay enriched oil slurry followed by the addition of the boron crosslinker. The oil-wetting surface active material and boron crosslinker may be added directly into the blender containing the clay enriched oil slurry and oil-wetting surface active material. Typically, the mixing described herein is at room temperature with the temperature range dictated by seasonal temperatures.

The non-aqueous slurry may further include a pH adjustment agent (such as sodium hydroxide, potassium hydroxide, sodium bicarbonate, potassium bicarbonate and an amine) and/or a pH buffering agent (such as potassium carbonate) in order to adjust the pH of the aqueous well treatment fluid to about 9.5 to 11.5 prior to crosslinking.

The non-aqueous slurry may be added to an aqueous fluid containing the gellant. The resulting fluid may then be pumped into the well as a fracturing fluid. Typically, the amount of gellant in the aqueous fracturing fluid is between from about 0.21 to about 1.05, more preferably from about 0.29 to about 0.84, most preferably from about 0.33 to about 0.50, ppb of the aqueous fracturing fluid.

The gellant, instead of being added to the aqueous fluid as a dry powder, may be first dispersed in a non-aqueous containing slurry ("non-aqueous gellant containing slurry"). The non-aqueous gellant containing slurry may then be added, with the non-aqueous slurry containing the crosslinking agent, to an aqueous fluid and the resulting aqueous fluid is then pumped into the well as an aqueous fracturing fluid. Typically, the amount of gellant in the non-aqueous gellant containing slurry is between from about to about 185, preferably from about 160 to about 170, ppb of the non-aqueous gellant containing slurry. The weight ratio of non-aqueous oil slurry containing crosslinking agent to non-aqueous gellant containing slurry in the aqueous well treatment fluid is generally between about 1:25 to about 2:1, preferably from about 1:25 to about 1:1, more preferably from about 2.0:49.5 to about 15.8:17.2, for example about 1:7 to about 1:2.

The non-aqueous gellant containing slurry contains a non-aqueous liquid and the gellant. Preferably, the non-aqueous liquid is an oil, such as any of the oils referenced above used in the oil-based slurry containing the crosslinking agent. The non-aqueous gellant containing slurry further preferably contains an organophilic clay. The organophilic clay may be any of the organophilic clays present in the oil based borate containing slurry. While the organophilic clays in the oil based borate containing slurry and the oil based gellant containing slurry are typically the same, different organophilic clays may be used as well. Typically, the amount of organophilic clay in the non-aqueous gellant containing slurry is between from about 3.6 to about 7.5, preferably from about 4.5 to about 5.5, ppb of the non-aqueous gellant containing slurry.

The non-aqueous based gellant containing slurry may be prepared by the addition of the organophilic clay to the oil. The oil may be any of the oils used in the oil-based slurry containing the crosslinking agent. When necessary, an activator may be added to the clay enriched oil. The clay may need to be activated in the oil. Suitable clay activators include propylene carbonate, ethanol and combinations thereof. When present, the amount of clay activator typically ranges from about 15% to about 40%, typically around 25%, to the weight of the clay.

Further, a water wetting surface active material may be added to the non-aqueous gellant containing slurry. The water wetting surface active material is typically added to the oil prior to the addition of the gellant. Once the non-aqueous gellant containing slurry is added to the aqueous fluid, the water-wetting surface active material aids in the removal of the oil from the surface of the gellant and thus facilitates hydration of the gellant.

The water-wetting surface active material may be non-ionic, anionic, cationic or amphoteric. Examples of suitable water wetting surface active materials include ethoxylated nonylphenol surface active material, polyoxyethylene sorbitan based surface active materials, fatty alcohol ethoxylates, such as tridecyl alcohol ethoxylate, etc. When present, the amount of water-wetting surface active material in the non-aqueous gellant containing slurry is between about 0.1% to about 10%, preferably from about 0.15% to about 3%, more preferably from about 0.2% to about 0.3% by weight based on the total weight of the non-aqueous gellant containing slurry.

The non-aqueous slurry containing the crosslinking agent and the non-aqueous gellant containing slurry may be prepared and transported to the wellsite. The non-aqueous gellant containing slurry and the slurry containing the crosslinking agent may be mixed sequentially in the aqueous treatment fluid at the wellsite depending on the needs of the operator. Typically, the weight ratio of slurry containing the crosslinking agent to non-aqueous gellant containing slurry in the aqueous well treatment fluid is between from about 1:25 to about 2:1, preferably from about 1:25 to about 1:1, more preferably from about 2.0:49.5 to about 15.8:17.2, for example about 1:7 to about 1:2. Preferably, at the wellsite, the non-aqueous slurry containing the crosslinking agent may be added to an aqueous fluid containing the gellant. In such instances, dry powder as gellant may be added to the aqueous fluid at the wellsite before or after the addition of the non-aqueous slurry containing the crosslinking agent.

Any of the organophilic clay, oil and clay activator in the non-aqueous gellant containing slurry may be the same or different as those in the non-aqueous slurry containing the crosslinking agent. In a preferred embodiment, the organophilic clay, non-aqueous liquid and clay activator in the non-aqueous slurry containing the crosslinking agent are the same as those in the non-aqueous oil gellant containing slurry.

The gellant is crosslinkable with the crosslinking agent.

Exemplary gellants are hydratable polymers and include polysaccharides such as cellulose, starch, and galactomannan gums. Suitable cellulose and cellulose derivatives include alkylcellulose, hydroxyalkyl cellulose or alkylhydroxyalkyl cellulose, carboxyalkyl cellulose derivatives such as methyl cellulose, hydroxyethyl cellulose, hydroxypropyl cellulose, hydroxybutyl cellulose, hydroxyethylmethyl cellulose, hydroxypropylmethyl cellulose, hydroxylbutylmethyl cellulose, methylhydroxyethyl cellulose, methylhydroxypropyl cellulose, ethylhydroxyethyl cellulose, carboxyethylcellulose, carboxymethylcellulose and carboxymethylhydroxyethyl cellulose. Specific galactomannan gums and derivatized galactomannan gums include underivatized guar, hydroxypropyl guar, carboxymethyl guar, hydroxyethyl guar, hydroxypropyl guar, carboxymethylhydroxyethyl guar and carboxymethylhydroxypropyl guar. Preferred are un-derivatized guar, carboxymethyl guar, carboxymethyhydroxypropyl guar and hydroxypropyl guar.

Other suitable polysaccharides include locust bean gum, tara gum or fenugreek gum or a mixture thereof.

Crosslinking of the gellant may be accomplished in two steps. First, the pH of the treatment fluid may be increased for hydration from a pH range of about 6.6 to 8.5 to a pH range between from about 9.5 to about 11.5 for crosslinking. The increase in pH may be by the use of common bases such as sodium hydroxide, potassium hydroxide, ammonium hydroxide, amines such as monoethanol amine, potassium carbonate or mixtures of these. Second, the crosslinking agent is one which completely dissolves within 30 sec to 3 min when added to the non-aqueous gellant containing slurry. For operational simplicity, metering and mixing is best accomplished by pumping a slurried dispersion of the borate salt in oil.

The preferred slurries are those composed of the borate salt dispersed in a non-solvent for the borate. The concentration of the borate powder in the oil depends on the amount of boron released from the salt when dissolved in the fracturing fluid. Typically, the borate ion concentration should range from about 200 to 1000, preferably from about 250 to 800, ppm per gallon of the slurry when added to 1000 gallon of fracturing fluid. More preferred is 350 to 600 ppm borate ion per gallon slurry per 1000 gal of fracturing fluid. These powders are normally sized as 70/140 mesh.

At the wellsite, well treatment additives may be added as needed to the fluid. Such additives may include one or more scale inhibitors, corrosion inhibitors, biocides, breakers, biocides, stabilizers, gas hydrate inhibitors, mutual solvents, bactericides, paraffin inhibitors, asphaltene inhibitors, iron control agents, relative permeability modifiers, sulfide scavengers and mixtures thereof.

In an embodiment, the amount of hydrocarbon based oil in the aqueous well treatment fluid is from about 10 about 25 ppb of the aqueous well treatment fluid, the amount of oil-wetting surface active material in the aqueous well treatment fluid is from about 0.03 to about 0.1 ppb of the aqueous well treatment fluid; the amount of crosslinking agent in the aqueous well treatment fluid is from about 1 to about 4 ppb of the aqueous well treatment fluid; the amount of organophilic clay in the aqueous well treatment fluid is from about 0.3 to about 1 pound per barrel of the aqueous well treatment fluid; and the amount of gellant in the aqueous well treatment fluid is from about 7 to about 16.5 ppb of the aqueous well treatment fluid.

The loading of gellant in the aqueous well treatment fluid may range from about 6 to about 40 lb/1000 gal water, typically from about 8 to about 15 lb/1000 gal and more typically between from about 8 to about 12 lb/1000 gal of water. It is the viscoelasticity of the gellant which enables the low loadings of gelling agent in the aqueous well treatment fluid.

The viscosity of the aqueous well treatment fluid introduced into the wellbore is typically less than 20 cP, more typically between 10 cP and 20 cP at 40 sec$^{-1}$. The viscosity of the aqueous well treatment fluid rapidly decreases when exposed to operational shear stresses. For instance, the viscosity of the aqueous well treatment fluid may be from about 4 to about 9 cP at 511 sec$^{-1}$ after introduction of the fluid into the wellbore. Where the crosslinking agent is a borate salt and the non-aqueous liquid is oil, the crosslinked gel viscosity, after the borate salt crosslinking agent crosslinks with the water-soluble gellant, may be from about 200 to 2,000 cP at 40 sec$^{-1}$.

Once in the fracture, thermal thinning of the fluid reduces viscosity so that high fluid velocity rather than viscosity places the proppant in the fracture. (The proppant referenced herein may be any recognized proppant in the field and may include sand, bauxite, coated sand, coated bauxite, a synthetic resin, a coated resin and include lightweight materials having a specific gravity less than sand or bauxite.) For instance, after formation of the crosslinked gel, the viscosity of the fluid at in-situ temperature conditions above 160° F. may be from 10 to 20 cP at 40 sec$^{-1}$. The thinned fluid, having a viscosity between 5 and 20 cP at 40 sec$^{-1}$, but having a larger viscosity than friction reducer-laden slickwater or linear gels, has substantially lower viscosity than conventional crosslinked fluid viscosity. It is thus better able to promote fracture complexity growth needed to increase production in the reservoir.

In light of the phenomena of thermal thinning of the fluid at in-situ conditions, the aqueous well treatment fluid may be characterized as a "lipping gel". As used herein, the term "lipping gel" (also referred to as "tonguing gel") refers to a deformable gel that undergoes deformation when a container housing the gel is tipped through an angle of 45°-90°. Deformation of the gel may take place by forming a "lip" or a "tongue" that can be retrieved into the container by returning the container back to its upright position. For instance, the reaction of a borate salt crosslinking agent and the gellant in a hydrocarbon based oil slurry at high pH conditions produces the crosslinked gel, thermal thinning occurring above about 130° F.

Unlike traditional fracturing where bi-wing fractures are formed, in the fracturing of low permeability reservoirs, such as shale, the fracturing fluid is a low viscosity fluid in the fracture. This enables the creation of multiple fractures, i.e., the formation of a fracture network, in a relatively short period of time. The majority of fracturing in low permeability reservoirs is in horizontal wellbores. Whereas in conventional fracturing, the fracturing fluid remains in the bi-wing, in the fracturing of low permeability reservoirs, it is important that the proppant in the fluid be carried quickly vertically into the well and then into the horizontal part of the well and across the perforations. Thus, it is desirable that the viscosity of the fluid be lower in the vertical portion of the well to minimize high friction pressures to minimize expensive pumping hydraulic horsepower, this being the importance of the delay crosslinking. Upon reaching the heel of the horizontal portion of the well, higher crosslinked viscosity is needed, especially fluids exhibiting viscoelastic characteristics, to transport or carry larger size and amounts of the proppant along the horizontal section of the well and across the perforations connecting the well to the reservoir. Once the fluid enters the reservoir, the fluid should thermally thin to a low viscosity fluid, maintaining 10 to 40 cP, typically less than 20 cP, at 40 sec$^{-1}$, in order for it to generate fracture complexity.

The aqueous well treatment fluid thus exhibits a higher viscosity than slickwater in the complex fracture network. The viscosity of the fluid is quickly decreased due to the natural reservoir temperatures. The fluid thins back to a viscosity which is more than linear gel (at most 6-7 cP at 511 sec$^{-1}$) itself at elevated temperatures of 130 to 140° F. which is sufficiently thin to initiate the secondary and tertiary fractures needed for shale production enhancement.

The aqueous fracturing fluid having a low loading of gellant further provides an excellent media for proppant transport. Proppant is suspended in the fracturing fluid in the near well portion of the fracture until thermal thinning reduces the proppant carrying capacity. This is the case even where the loading of gellant is from 6 to 8 pounds per 1,000 gallons (pptg) of water. The capability of proppant transport in the fluid containing low loading of gellant is attributable to the elasticity of the fluid (evidenced by the fluid being a lipping gel).

Being almost ten times higher than the viscosity of slickwater, the well treatment fluid provides for better proppant placement than slickwater operations. The crosslinked gel structure coupled with the low viscosity of the well treatment fluid further enables the transport of higher amounts of proppant into the formation than that offered by slickwater. Proppant placement into the secondary fractures within the created fracture network is therefore more efficient. Thus, the aqueous fracturing fluid provides a transport media for carrying larger volumes of proppant across the lateral and perforations than in a slickwater process but yet allows the fluid to revert back to near-slickwater behavior in the fracture.

The use of the aqueous fluid disclosed herein reduces damage to the subterranean formation being subjected to the fracturing operation compared to conventional fracturing fluids. The reaction between the crosslinking agent and gellant is delayed by the presence of the oil-wetting surface active material in the slurry as the oil-wetting surface active material decreases the rate of wetting of the crosslinking agent by water. Since the reaction between the crosslinking agent and gellant is delayed, less gellant is needed to carry proppant into the formation. Typically from about 6 to 12 pptg water of gellant is in the fluid. Fluids having low loadings of gellant reduce damage to the formation caused by the presence of gellant.

Further, due to viscosity loss by thermal thinning, the fracturing fluid, having low polymer loading, tolerates a more aggressive amount of breaker than conventional gels. Breakers are normally included in fracturing fluids in order to reduce fluid viscosity so that degraded fracturing fluid can be recovered while leaving the proppant in the fracture network. Breakers are designed to degrade the polymer gel to prevent gel residue-related flow impairment in the proppant pack. Conventional breakers include strong oxidizing agents such as ammonium or sodium persulfate, hydrogen peroxide, calcium peroxide, magnesium peroxide, t-butyl hydroperoxide, cumene hydroperoxide and sodium chlorite. In addition, breakers can include enzymes capable of degrading galactomannan polysaccharide gelling agents. These enzymes include hemicellulases, amylases as well as guar specific enzymes, such as gammanases.

The type and amount of breaker is normally determined by lab testing prior to the fracturing treatment. The amount of breaker, referred to as the breaker schedule, is normally based on rheology testing as described in API's ISO 13503-1, formerly RP-39. Ideally, the amount of breaker in the fluid has minimal effects on the viscosity of the fracturing fluid early in the treatment to allow proppant placement in the fracture. For temperatures between 130° F. and 180° F., ammonium or sodium persulfate can be used at concentrations such as 0.25 to 2.0 lb/1000 gal. Enzymes can be used in the diluted form from the concentrate by diluting the concentrate such as Elanco's High pH Enzyme Breaker with 1 part enzyme concentrate to 299 parts (by vol) and using 0.25 to 5.0 gpt. At temperatures greater than 180° F., the amount of enzyme breaker in the fracturing fluid may be 0.25 to 5.0 gpt of a 10% (by wt) sodium chlorite solution. Afterward, the breaker degrades the fracturing fluid to allow maximum fluid recovery and no gel damage that could cause flow impairment in the proppant pack. In practice, some flow impairment results because of a loss of viscosity early in the treatment operation. This viscosity loss should be an insufficient amount to allow complete degradation of the fluid.

Since the fracturing fluids set forth herein may have low polymer loading, significant viscosity loss occurs due to thermal thinning of the fluid. The fluid can thus tolerate high amounts of breaker as the complexity of the fracture grows. In this case, the well temperature adjacent the perforations, after several tubing volumes of fluid, is typically from 5° F. to about 20° F. warmer than the fluid temperature on the surface. The lower temperature prevents the oxidizer breaker from activating, allowing the fluid to transport proppant from the surface, along the lateral and across the perforations without significantly effecting viscosity. Once in the fracture, thermal thinning reduces the viscosity of the fluid such that fluid velocity rather than viscosity places the proppant in the fracture. The thinned fluid, having a viscosity between 5 and 20 cP but having a larger viscosity than friction reducer-laden slickwater or linear gels, has substantially lower viscosity than conventional cross-linked fluids. This lower viscosity is better able to promote fracture complexity and thus increases production from the reservoir. This is especially the case with shale reservoirs.

Due to viscosity loss by thermal thinning, the ultra-low polymer fracturing fluid can tolerate more aggressive amounts of breaker than conventional gels. Typically, the amount of breaker in the fracturing fluid is from about 0.001 to about 0.024, preferably from about 0.003 to about 0.018, more preferably from about 0.006 to about 0.012, based on the total weight of the fracturing fluid. This tolerance to breaker promotes less proppant pack damage and less flow impairment through the proppant pack, allowing enhanced oil or gas production.

EXAMPLES

The following examples are illustrative of some of the embodiments of the present disclosure. Other embodiments within the scope of the claims herein will be apparent to one skilled in the art from consideration of the description set forth herein. It is intended that the specification, together with the examples, be considered exemplary only, with the scope and spirit of the disclosure being indicated by the claims which follow.

All percentages set forth in the Examples are given in terms of weight units except as may otherwise be indicated.

Example 1

The slurries were prepared in the order of addition from top to bottom using a lightning stirrer using the weights defined in Table 1. 500 ml of tap water was poured into a WARING blender. The slurry was prepared as follows: 1.0 ml of a guar slurry containing 0.48 g of guar gum was mixed for several minutes until the gum was hydrated. The pH was adjusted to pH 10.0 with 25% sodium hydroxide solution. The blender speed was then adjusted to 1300 rpm to create a vortex. The 0.7 ml of the crosslinking agent was added to the solution and a stopwatch started. The time needed for the vortex to close was measured for each slurry formulation. This test shows that by varying the surface active material loadings, the time of crosslinking can be controlled. (The vortex in the blender closes as the polymer crosslinks and increases in gel strength or viscosity.)

All surface active materials in the examples are oil-wetting agents for borax.

TABLE 1

| Slurry Components | Product Trade name | Manufacturer | F1 | F2 | F3 | F4 |
|---|---|---|---|---|---|---|
| Hydro-treated Naphtha (g) | LPA-170 | Sasol | 87 | 85 | 83 | 81 |
| Ethox3571 (g) | Ethox 3571 | Ethox | 0 | 1 | 2 | 3 |
| Ethoxylated Coconut Glyceride (g) | Ethox1212 | Ethox | 0 | 1 | 2 | 3 |
| Organophilic Clay (g) | Claytone SF | Southern Clay | 3 | 3 | 3 | 3 |
| Propylene carbonate (g) | | | 0.6 | 0.6 | 0.6 | 0.6 |
| Sodium Tetraborate decahydrate (g) | | | 60 | 60 | 60 | 60 |
| Ethsorb-L (g) | Ethsorb-L | Ethox | 0.2 | 0.2 | 0.26 | 0.4 |
| closure time(seconds) | | | 17 | 20 | 26 | 34 |

Note:
8# gel system, pH = 10.0, 0.7 ml in 500 ml(1.4gpt loading), 1300 RPM

Example 2

The slurries were prepared in the order of addition from top to bottom using a lightning stirrer and using the weights defined in Table 2. After the slurries were prepared, 250 ml of tap water was poured into a WARING blender. The water was treated 0.50 ml of a guar slurry containing 0.24 g of guar gum and mixed for several minutes until the gum was hydrated. The pH was adjusted as shown in the chart with 25% sodium hydroxide solution. The blender speed was then adjusted to 980 rpm to create a vortex. Then, 0.35 ml of the crosslinking agent was added to the solution and a stopwatch started. The time needed for the vortex to close was measured for each slurry formulation. This test shows that by varying the surface active material type as compared to Table 1 and the loadings, the time of crosslinking can be easily controlled.

TABLE 2

| Slurry Components | Product Trade name | Manufacturer | F5 | F6 | F7 | F8 | F9 | F10 |
|---|---|---|---|---|---|---|---|---|
| Hydro-treated Naphtha (g) | LPA-170 | Sasol | 87 | 87 | 87 | 87 | 87 | 87 |
| Polyoxyethylene Glycol Ether (g) | Ethox2988 | Ethox | 0 | 0 | 0 | 0 | 1.5 | 1.5 |
| Ethoxylated Coconut Glyceride (g) | Ethoxl212 | Ethox | 1.5 | 1.5 | 2 | 2 | 0 | 0 |
| Organophilic Clay (g) | Claytone SF | Southern Clay | 3 | 3 | 3 | 3 | 3 | 3 |
| Propylene carbonate (g) | | | 0.6 | 0.6 | 0.6 | 0.6 | 0.6 | 0.6 |
| Sodium Tetraborate decahydrate (g) | | | 60 | 60 | 60 | 60 | 60 | 60 |
| pH = | | | 10.71 | 10.88 | 10.88 | 10.95 | 10.75 | 11.03 |
| closure time(seconds) | | | 43 | 50 | 70 | 75 | 53 | 69 |

Note:
8# gel system, 0.35 ml in 250 ml(1.4gpt loading), 980 RPM

Example 3

The slurries were prepared in the order of addition from top to bottom using a lightning stirrer and using the weights defined in Table 3. After the slurries were prepared, 500 ml of tap water was poured into a WARING blender. The water was treated 1.0 ml of a guar slurry containing 0.48 g of guar gum and mixed for several minutes until the gum was hydrated. The pH was adjusted to pH 10.0 as shown in the chart with 25% sodium hydroxide solution. The blender speed was then adjusted to 1250 rpm to create a vortex. Then, the crosslinking agent was added, based on the volume shown in the chart, to the solution and a stopwatch started. The time needed for the vortex to close was measured for each slurry formulation. This test shows that by varying the surface active material amount in the slurry and the loadings, the time of crosslinking can be easily controlled and can be extended to long periods of time, if needed.

TABLE 3

| | Product | | Test Numbers | | | | |
|---|---|---|---|---|---|---|---|
| Slurry Components | Trade name | Manufacturer | F11 | F12 | F13 | F14 | F15 |
| Hydro-treated Naphtha (g) | LPA-170 | Sasol | 40 | 25 | 25 | 25 | 25 |
| Organophilic Clay (g) | Claytone SF | Southern Clay | 1.5 | 0.95 | 0.95 | 0.95 | 0.95 |
| Propylene carbonate (g) | | | 0.3 | 0.172 | 0.172 | 0.175 | 0.175 |
| Sodium Tetraborate decahydrate (g) | | | 25 | 17.537 | 25 | 22 | 19 |
| Polyhydroxy Ester-based (g) | Ethox 2974 | Ethox | 25 | 13.6 | 11 | 4 | 2.3 |
| pH = | | | 10 | 10 | 10 | 10 | 10 |
| loading(gpt) = | | | 1 | 2 | 1.4 | 2 | 2.2 |
| closure time(seconds) | | | 180 | >180 | >180 | 94 | 94 |

Note:
8# gel system, 1250 RPM

Example 4

The slurries were prepared in the order of addition from top to bottom using a lightning stirrer and using the weights defined in Table 4. In this table, a mixture of the deca- and pentahydrate were tested to evaluate the wetting effect on different types of borate salts. After the slurries were prepared, 500 ml of tap water was poured into a WARING blender. The water was treated 1.0 ml of a guar slurry containing 0.48 g of guar gum and mixed for several minutes until the gum was hydrated. The pH was adjusted to about pH 10.0 as shown in the chart with 25% sodium hydroxide solution. The blender speed was then adjusted to 1300 rpm to create a vortex. Then, the crosslinking agent was added, based on the volume shown in the chart, to the solution and a stopwatch started. The time needed for the vortex to close was measured for each slurry formulation. This test shows that by varying the surface active material amount in the slurry and the loadings, the time of crosslinking can be easily controlled and can be extended to long periods of time, if needed.

TABLE 4

| | Product | | Test Numbers | | | |
|---|---|---|---|---|---|---|
| Slurry Components | Trade name | Manufacturer | F16 | F17 | F18 | F19 |
| Hydro-treated Naphtha (g) | LPA-170 | Sasol | 25 | 25 | 25 | 50 |
| Organophilic Clay (g) | Claytone SF | Southern Clay | 0.95 | 0.95 | 0.95 | 1.9 |
| Propylene carbonate (g) | | | 0.175 | 0.175 | 0.175 | 0.35 |
| Sodium Tetraborate decahydrate (g) | | | 0 | 17 | 17 | 38 |
| Sodium Tetraborate pentahydrate (g) | | | 19.5 | 2.5 | 2.5 | 0 |
| Polyhydroxy Ester-based (g) | Ethox 2974 | Ethox | 3.2 | 3 | 2 | 4 |
| pH = | | | | | | 10.07 |
| loading(gpt) = | | | 1.6 | 1.8 | 1.6 | 2 |
| Closure time(seconds) | | | 20 | 94 | 68 | 110 |

Note:
8# gel system, 1300 RPM

Example 5

The slurries were prepared in the order of addition from top to bottom using a lightning stirrer and using the weights defined in Table 5. In this table, a mixture of the sodium octaborate tetrahydrate was tested to evaluate the wetting effect on different types of adsorbing surface active materials. After the slurries were prepared, 500 ml of tap water was poured into a WARING blender. The water was treated 2.5 ml of a guar slurry containing 1.20 g of guar gum and mixed for several minutes until the gum was hydrated. The pH was adjusted to about pH 10.0 as shown in the chart with 25% sodium hydroxide solution. The blender speed was then adjusted to 1300 rpm to create a vortex. Then, the cross-linking agent was added, based on the volume shown in Table 5, to the solution and a stopwatch started. The time needed for the vortex to close was measured for each slurry formulation. This test shows that by varying the surface active material type in the slurry, the time of crosslinking can be easily controlled and can be extended to long periods of time, if needed.

TABLE 5

| Slurry Components | Product Name Trade | Manu-facturer | Test Numbers F20 | F21 |
|---|---|---|---|---|
| Hydro-treated Naphtha (g) | LPA-170 | Sasol | 66.39 | 66.39 |
| Organophilic Clay (g) | Claytone SF | Southern Clay | 2.48 | 2.48 |
| Propylene carbonate (g) | | | 0.46 | 0.46 |
| Disodium Octaborate Tetra Hydrate (g) | | | 30.52 | 30.52 |
| Tridecyl alcohol 9 mole EO | TDA-9 | BASF | 0.00 | 0.15 |
| Polyhydroxy Ester-based (g) | Ethsorb-L | Ethox | 0.15 | 0.00 |
| pH = | | | 10.0 | 10.0 |
| loading(gpt) = | | | 1.0 | 1.0 |
| Closure time(seconds) at 39° F. | | | 136 | 130 |
| Closure time(seconds) at 34° F. | | | 191 | 151 |

Note:
20# gel system, 1300 RPM

Example 6

Hydraulic fracturing fluids are designed to create optimum fracture geometry, that being length and a fracture width to allow entry of the proppant. The fluid is also designed to carry the proppant from the surface to the fracture, especially in horizontal wells that employ extensive horizontal laterals that can be 3000 to 6000 feet in distance. Unlike vertical wells, in the horizontal portion, gravity forces are perpendicular to the direction of fluid flow, these forces responsible for sand settling and banking in the wellbore. This example shows the fluid of this invention is capable of transporting proppant in the horizontal portion of the well.

Into 500 ml of tap water mixing in a Waring™ blender was added 1.5 ml of a guar gum dispersed in mineral oil with an equivalent concentration of 12 lbs of guar gum per 1000 gallons of fracturing fluid. The fluid was mixed at 1500 rpm for two minutes and then adjusted to pH 10.0 with 25% (wt) sodium hydroxide solution. After pH adjustment, the fluid was treated with 0.70 ml of the crosslinking agent defined in Example 5 formulation F20 and 120 g of 20/40 Northern White Sand (specific gravity 2.65) and mixed for one minute at 1300 rpm. The sand concentration is equivalent to 2 lb/gal.

After mixing, the sand-laden gel was poured into a 500 ml graduated cylinder at 72° F. and a timer started. In comparison, the sand fall was compared to a guar polymer solution at the same concentration but without crosslinking. The fall was 15 inches in 2.5 sec or 359"/min. These data are reported in Table 6. This data shows the ultra-low polymer based crosslinked fracturing fluid can adequately transport proppant much more efficiently than just the polymer solution without crosslinking.

TABLE 6

| Time (min) | Example 6 Fall Distance (inches) | Example 6 Fall Rate (in/min) | Time (min) | Example 7 Fall Distance (inches) | Example 7 Fall Rate (in/min) |
|---|---|---|---|---|---|
| 10 | 1 | 0.10"/min | 4 | 2" | 0.5"/min |
| 15 | 2 | 0.13"/min | | | |
| 20 | 3 | 0.15"/min | | | |

Example 7

Into 500 ml of tap water mixing in a Waring™ blender was added 1.0 ml of a guar gum dispersed in mineral oil with an equivalent concentration of 8 lbs of guar gum per 1000 gallons of fracturing fluid. The fluid was mixed at 1500 rpm for two minutes and then adjusted to pH 10.0 with 25% (wt) sodium hydroxide solution. After pH adjustment, the fluid was treated with 0.80 ml of the crosslinking agent defined in Example 5 formulation F20 and 120 g of 20/40 Northern White Sand (specific gravity 2.65) and mixed for one minute at 1300 rpm. The sand concentration is equivalent to 2 lb/gal. After mixing, the sand-laden gel was poured into a 500 ml graduated cylinder at 72° F. and a timer started. In comparison, the sand fall was compared to a guar polymer solution at the same concentration but without crosslinking. The fall was 15 inches in 1.5 sec or 600"/min. These data are reported in Table 6. This data shows the ultra-low polymer based crosslinked fracturing fluid can adequately transport proppant much more efficiently than just the polymer solution without crosslinking.

Example 8

Into 500 ml of tap water mixing in a Waring™ blender was added 2.0 ml of a guar gum dispersed in mineral oil with an equivalent concentration of 16 lbs of guar gum per 1000 gallons of fracturing fluid. The fluid was mixed at 1500 rpm for two minutes and then adjusted to pH 10.0 with 25% (wt) sodium hydroxide solution. After pH adjustment, the fluid was treated with 0.80 ml of the crosslinking agent defined in Example 5 formulation F20 and mixed for one minute at 1300 rpm. After mixing, 65 ml of gel was syringed into a Grace 5600 sample cup and placed on the rheometer at 72° F. and ambient pressure. The gel was then subjected to oscillatory shear with the frequency ranging from 0.1 to 4 Hz at 5% strain over a 5 min period. The sweeps were repeated 6 times to evaluate a change in the crosslinking density. These were examined by changes in the storage modulus, G' and the loss or viscous modulus, G". This fluid is designated as Fluid A and the results are shown in the Table 7. As a comparison, the fluid of this invention was compared to a gel made with the same polymer concentration and pH but using conventional crosslinkers composed of a 0.5 ml of delay crosslinker, ulexite ore dispersed in a potassium formate solution and available from TBC Brinadd as FracSal Ultra and 0.4 ml of a surface borate crosslinker composed of 2% boron and available from Independence Oilfield Chemicals as XLW-B2. This conventional fluid is designated as Fluid C in Table 7.

TABLE 7

| Freq (Hz) | Fld A 10 min (G') | Fld A 10 min (G') | Fld A 25 min (G') | Fld A 25 min (G') | Fld C 10 min (G') | Fld C 10 min (G') | Fld C 25 min (G') | Fld C 25 min (G') |
|---|---|---|---|---|---|---|---|---|
| 0.1 | 3.5 | 5.6 | 1.5 | 4.9 | 1.0 | 4.5 | 5.5 | 9.1 |
| 0.2 | 2.9 | 6.2 | 3.0 | 4.3 | 1.3 | 4.4 | 0.0 | 4.3 |
| 0.3 | 12.4 | 8.3 | 6.7 | 7.5 | 5.9 | 5.9 | 6.6 | 6.2 |
| 0.4 | 11.4 | 7.7 | 9.7 | 2.3 | 4.5 | 6.9 | 0.0 | 8.6 |
| 0.5 | 11.0 | 7.3 | 7.8 | 4.6 | 2.6 | 7.2 | 6.7 | 7.2 |
| 1.0 | 10.5 | 6.8 | 10.8 | 5.2 | 3.8 | 6.5 | 8.2 | 3.4 |
| 2.0 | 15.7 | 2.7 | 18.3 | 9.4 | 7.0 | 4.4 | 9.7 | 3.4 |
| 3.0 | 20.3 | 4.1 | 17.1 | 18.4 | 14.0 | 6.0 | 12.2 | 8.2 |
| 4.0 | 19.0 | 7.6 | 17.3 | 5.9 | 8.2 | 4.8 | 10.2 | 0.5 |
| 5.0 | 20.5 | 0.0 | 16.8 | 5.3 | 7.0 | 5.7 | 6.9 | 4.2 |

This data suggests the new, novel fluid is more viscoelastic than the conventional fluid in both the short time and the long time crosslink intervals.

While not being bound by theory, Applicants believe that the oil-wetting surface active material in the oil slurry increases the time for the water to displace oil from the surface of the borate particles and thereafter to dissolve the borate in the water to effect crosslinking of the polymer.

Although the present invention has been described with respect to specific details, it is not intended that such details should be regarded as limitations on the scope of the invention, except to the extent that they are included in the accompanying claims.

From the foregoing, it will be observed that numerous variations and modifications may be effected without departing from the true spirit and scope of the novel concepts of the disclosure.

What is claimed is:

1. A non-aqueous liquid immiscible in water comprising:
   (i) a non-polar hydrocarbon oil;
   (ii) an oil-wetting surface active material selected from the group consisting of sorbitan esters, ethoxylated sorbitan esters, alkoxylated glycerides and alkylene oxide adducts of a C6-C30 alcohol or phenol or a mixture thereof;
   (iii) an organophilic clay;
   (iv) a crosslinking agent of a borate ion source; and
   (v) optionally, a clay activator.

2. The non-aqueous liquid of claim 1, wherein the liquid contains a clay activator selected from propylene carbonate, ethanol or a combination thereof.

3. The non-aqueous liquid of claim 1, wherein the crosslinking agent is selected from the group consisting of organoborates, monoborates, polyborates, mineral borates, boric acid, borax, sodium borate, colemanite and ulexite.

4. The non-aqueous liquid of claim 3, wherein the crosslinking agent is selected from the group consisting of boric acid, sodium borate decahydrate, sodium tetraborate decahydrate, sodium borate pentahydrate, sodium tetraborate anhydrous, sodium metaborate and sodium octaborate tetrahydrate and mixtures thereof.

5. The non-aqueous liquid of claim 1, wherein the non-polar hydrocarbon oil includes $C_3$-$C_{20}$ hydrocarbons.

6. The non-aqueous liquid of claim 1, wherein the non-polar hydrocarbon oil is a hydrotreated naphtha or raffinate.

7. The non-aqueous liquid of claim 1, wherein the non-polar hydrocarbon oil is mineral oil or diesel oil.

8. The non-aqueous liquid of claim 1, wherein the borate crosslinking agent is disodium octaborate tetrahydrate.

9. The non-aqueous liquid of claim 1, wherein the organophilic clay is the reaction product of purified smectite clay and a quaternary ammonium salt.

10. The non-aqueous liquid of claim 9, wherein the purified smectite clay is selected from the group consisting of hectorite, bentonite, attapulgite, sepiolite, montmorillonite and mixtures thereof.

11. The non-aqueous liquid of claim 1, wherein the clay is dispersed in the non-polar hydrocarbon oil.

12. The non-aqueous liquid of claim 1, wherein:
   (a) the amount of the oil-wetting surface active material in the liquid is from about 0.05 to about 10 percent by weight;
   b) the amount of organophilic clay in the liquid is between from about 6 to 10 ppb;
   (c) the amount of crosslinking agent in the liquid is between from about 30 to about 250 ppb; and
   (d) the amount of clay activator, when present in the liquid, is from about 15 to about 75 percent by weight of the clay.

13. The non-aqueous liquid of claim 12, wherein the amount of non-polar hydrocarbon oil in the liquid is from about 100 to about 500 pounds per barrel.

14. The non-aqueous liquid of claim 13, wherein the amount of non-polar hydrocarbon oil in the liquid is between from about 100 to about 235 pounds per barrel.

15. The non-aqueous liquid of claim 12, wherein the oil-wetting surface active material is a sorbitan ester selected from the group consisting of sorbitan monooleate, sorbitan monolaurate, sorbitan monopalmitate, sorbitan trioleate, polyoxyethylene glycol sorbitan hexaoleate and polyoxyethylene sorbitol hexaoleate.

16. A non-aqueous liquid immiscible in water comprising:
   (i) a non-polar hydrocarbon oil;
   (ii) an oil-wetting surface active material selected from the group consisting of sorbitan esters and ethoxylated sorbitan esters;
   (iii) a dispersed organophilic clay;
   (iv) a crosslinking agent of a borate ion source; and
   (v) optionally, a clay activator.

17. The non-aqueous liquid of claim 16, wherein the liquid contains a clay activator selected from propylene carbonate, ethanol or a combination thereof.

18. The non-aqueous liquid of claim 16, wherein the crosslinking agent is selected from the group consisting of organoborates, monoborates, polyborates, mineral borates, boric acid, borax, sodium borate, colemanite and ulexite.

19. The non-aqueous liquid of claim 18, wherein the crosslinking agent is selected from the group consisting of boric acid, sodium borate decahydrate, sodium tetraborate decahydrate, sodium borate pentahydrate, sodium tetraborate anhydrous, sodium metaborate and sodium octaborate tetrahydrate and mixtures thereof.

20. The non-aqueous liquid of claim 19, wherein the borate crosslinking agent is sodium octaborate tetrahydrate.

21. The non-aqueous liquid of claim 16, wherein the dispersed organophilic clay is a reaction product of montmorillonite and a quaternary ammonium salt.

22. The non-aqueous liquid of claim 16, wherein the oil-wetting surface active agent is sorbitan monolaurate.

* * * * *